United States Patent
Watkins

[15] 3,665,103

[45] May 23, 1972

[54] SYNCHRONOUS FREQUENCY SHIFT DATA TRANSMISSION SYSTEM IN WHICH OPPOSITE BINARY CHARACTERIZATIONS ARE TRANSMITTED AS HALF CYCLES OF A FIRST CARRIER SIGNAL AND AS FULL CYCLES OF A SECOND CARRIER SIGNAL

[72] Inventor: Robert V. Watkins, San Jose, Calif.

[73] Assignee: International Business Machines Corporation, Armonk, N.Y.

[22] Filed: Dec. 16, 1969

[21] Appl. No.: 885,555

[52] U.S. Cl. ..............................178/66 R, 325/30, 325/163

[51] Int. Cl. ..............................H04l 27/12

[58] Field of Search....................325/30, 163, 320; 178/66 R

[56] References Cited

UNITED STATES PATENTS

| | | | |
|---|---|---|---|
| 3,437,932 | 4/1969 | Malakoff | 325/320 |
| 3,165,583 | 1/1965 | Kretzmer et al. | 325/30 |
| 3,377,560 | 4/1968 | Renshaw | 325/320 |
| 3,493,877 | 2/1970 | Jacobson | 325/320 |
| 3,239,769 | 3/1966 | Hua-Tung Lee | 325/320 |
| 3,206,678 | 9/1965 | Hannon | 325/30 |
| 3,102,238 | 8/1963 | Bosen | 325/30 UX |

*Primary Examiner*—Robert L. Griffin
*Assistant Examiner*—Peter M. Pecori
*Attorney*—Fraser and Bogucki

[57] ABSTRACT

A data transmission system in which data to be transmitted is encoded using double frequency coding, the keying signal which defines the individual bit cells being in-phase with first and second carrier signals having frequencies equal to that of the keying signal frequency and twice that of the keying signal frequency. Opposite binary characterizations ("zeros" and "ones") are respectively transmitted as a half-cycle of the first carrier signal or a full cycle of the second carrier signal within the appropriate bit cells, the synchronous relationship between the keying and carrier signals providing for bit cells of equal size and self-clocking. Encoded data is processed at the transmitting and receiving ends of a transmission line by circuitry which is transformer coupled to the line at both ends to provide isolation and minimize common mode noise and ground shift problems, and which is impedance matched to the line to provide high noise immunity.

8 Claims, 4 Drawing Figures

INVENTOR.
ROBERT V. WATKINS
BY Fraser and Bogucki
ATTORNEYS

INVENTOR.
ROBERT V. WATKINS
BY Fraser and Bogucki
ATTORNEYS

INVENTOR.
ROBERT V. WATKINS
BY
Fraser and Bogucki
ATTORNEYS

INVENTOR.
ROBERT V. WATKINS
BY
Fraser and Bogucki
ATTORNEYS

SYNCHRONOUS FREQUENCY SHIFT DATA TRANSMISSION SYSTEM IN WHICH OPPOSITE BINARY CHARACTERIZATIONS ARE TRANSMITTED AS HALF CYCLES OF A FIRST CARRIER SIGNAL AND AS FULL CYCLES OF A SECOND CARRIER SIGNAL

BACKGROUND OF THE INVENTION

1. Field of the Invention

The present invention relates to data transmission systems, and more particularly to systems for transmitting binary or digital data over transmission lines of relatively short length.

2. Description of the Prior Art

Systems for transmitting data in binary or digital form over relatively short transmission lines find wide application in data processing and other related operations. In certain types of information storage and retrieval systems, for example, it is not uncommon for binary data to be stored on magnetic or other appropriate storage media located at physical distances up to one mile or more from a central computer. A system must accordingly be provided for communicating messages such as interrogation signals between the computer and the data storage media, as well as for communicating the stored data to the computer.

One technique commonly employed to transmit binary or digital data involves the use of base band transmission in which the data is communicated as a series of pulses of one fundamental frequency. In many early applications of base band transmission, positive or negative pulses were used to represent binary "ones" while the absence of pulses was used to represent binary "zeros". This involved several problems however, perhaps the most serious of which was the frequent loss of synchronization due to the absence of pulses in a long string of "zeros". This problem was partly avoided by grouping adjacent data bits into pairs and representing the data bits in such pairs by various combinations of pulses and the absence of pulses. However, even this measure does not solve the synchronization problem inherent to base band transmission, nor does it decrease or otherwise improve on the relatively long startup time required to set up clocking and synchronization prior to transmission of the data.

One prior art technique which avoids some of the problems inherent to base band transmission involves the use of frequency shift transmission in which binary "ones" and "-zeros" are transmitted by two different carrier signals having unrelated frequencies and phases. The carrier signals are also unrelated in frequency or phase to a keying signal used to define the bit cells for the data to be transmitted. Thus where telephone lines having a maximum bandwidth of 3.5KHz are to be used, a typical frequency shift transmission system may employ a pair of oscillators at the transmitting end for generating carrier signals of 2.3KHz and 1.2KHz, and FM type detection circuitry at the receiver end employing a free-running oscillator. Such an arrangement is not self-clocking and frequently produces bit cells of unequal size, thereby requiring the transmission of a separate clocking signal and an accompanying increase in the system bandwidth. A further disadvantage lies in the use of separate oscillators to generate the carrier signals. Due to the inductance and capacitance typically present in such circuits, it is difficult to turn them on and off within bit cell intervals on the order of 800 nanoseconds, let alone begin transmission in a particular phase relationship.

BRIEF SUMMARY OF THE INVENTION

Data transmission systems in accordance with the invention employ synchronous frequency shift to communicate the data in double frequency encoded form. A keying signal which defines the individual bit cells is in-phase with and has a frequency equal to the first of a pair of carrier signals. The second one of the pair of carrier signals is in-phase with and has a frequency twice that of the keying and first carrier signals. Opposite binary characterizations ("zeros" and "ones") are respectively transmitted as a half-cycle of the first carrier signal or a full cycle of the second carrier signal within the appropriate bit cells. The synchronous relationship between the keying and carrier signals provides for the transmission of a clocking signal for each bit using the same bandwidth normally required for the transmission of the data bits alone in non-synchronous frequency shift transmission systems.

In one preferred arrangement of a transmission system according to the invention, data to be transmitted is encoded in double frequency fashion under the control of an oscillator and associated circuitry which provide a clock or keying signal of frequency "$f$" defining the individual bit cells for the data to be encoded and data strobe pulses occurring at the centers of the respective bit cells. The eight bits of each byte of data to be transmitted are entered in parallel in a shift register, and are thereafter serially advanced out of the shift register under the control of the clock signal to change the state of an associated flip-flop. The state of the flip-flop is changed once during each bit cell in response to a binary "zero" and twice during each bit cell in response to a binary "one" to define carrier signals of frequency "$f$" and "$2f$" respectively.

The resulting changes in the output voltage of the flip-flop are utilized by transmission circuitry according to the invention to provide a signal to a transmission line. The transmission circuitry includes a pair of alternately conducting transistors and associated transformer primary windings which induce voltages of opposite sense in a secondary winding coupled to the transmission line. Conduction of the transistor pair is controlled by a control transistor and associated capacitor. Whenever the input signal as provided by the flip-flop is a positive voltage, the control transistor is biased into conduction to bias a first one of the pair of transistors into conduction while at the same time preventing conduction of the second transistor by discharging the previously charged capacitor. When the input signal drops to zero voltage, conduction of the control transistor is terminated ceasing conduction of the first transistor and initiating conduction of the second transistor via the resultant charging of the capacitor. The presence of the transformer and impedance matching of the transmitting circuitry to that of the transmission line provide high noise immunity.

The receiving circuitry according to the invention is coupled to the receiving end of the transmission line via a transformer which provides isolation and which steps up the voltage of received signals to improve sensitivity. A positive input signal renders one of a pair of alternately conductive transistors conductive and the other transistor nonconductive, while a negative input signal produces the reverse effect. A pair of diodes clamp the base of the one transistor to prevent overdriving thereof in response to large input signals, and a resistor coupled to the secondary winding of the transformer provides impedance matching of the receiving circuitry to the transmission line. The alternate conduction and nonconduction of one of the transistors provides an output voltage varying between zero voltage and a positive voltage to reconstruct the input signal to the transmitting circuitry at the transmission end of the system. The self-clocking signal as detected is thereafter processed to derive a clocking signal which is used to separate the "zero" and "one" bits.

BRIEF DESCRIPTION OF THE DRAWINGS

The foregoing and other objects, features and advantages of the invention will be apparent from the following more particular description of preferred embodiments of the invention, as illustrated in the accompanying drawings, in which.

DETAILED DESCRIPTION

Figure 1:
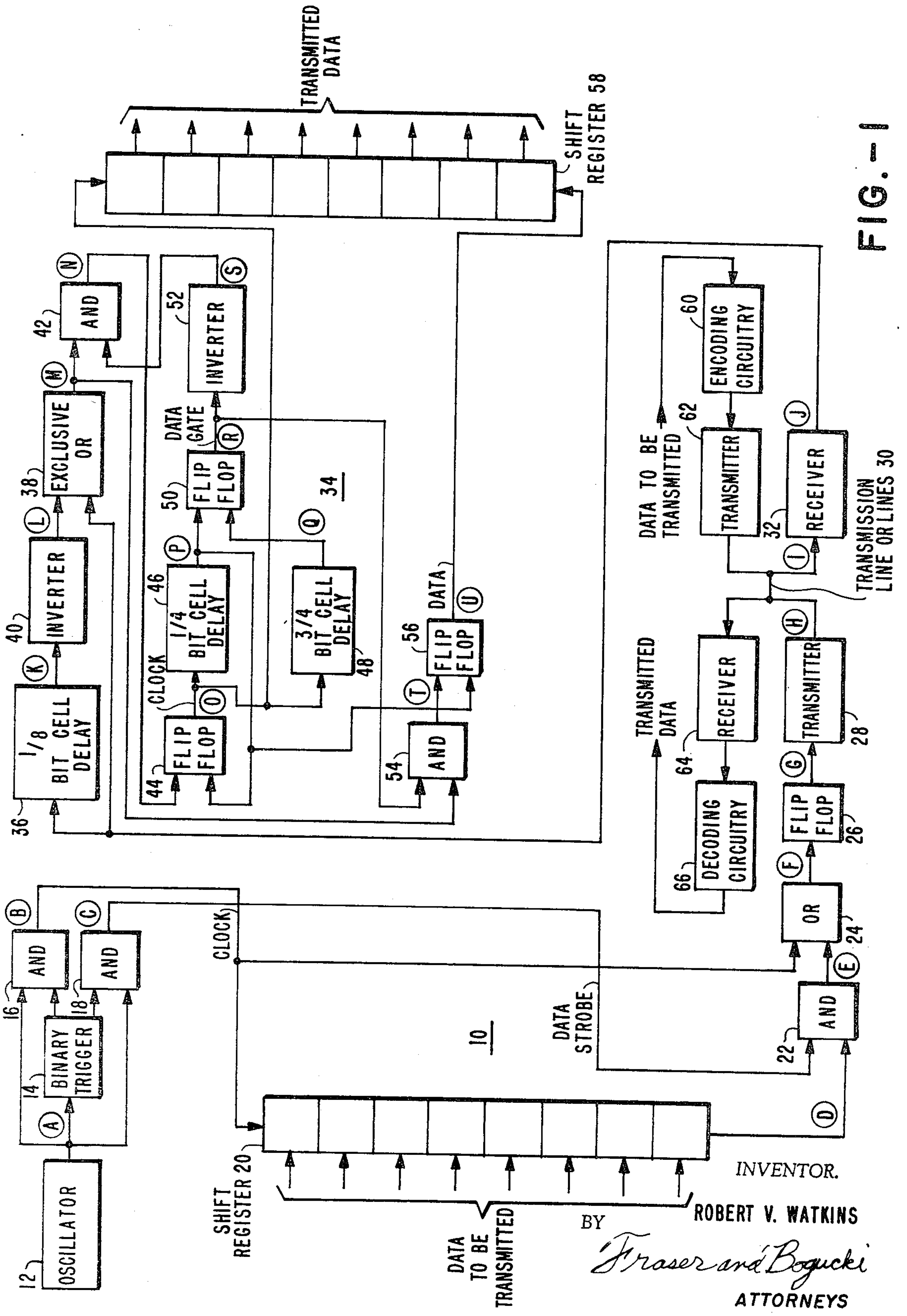
FIG. 1 is a block diagram of a synchronous frequency shift data transmission system in accordance with the invention.

The data transmission system of FIG. 1 will be described in connection with the various waveforms of FIGS. 2A through 2U, the various letters A, B, C, etc. of FIG. 2 corresponding to the encircled letters A, B, C, etc. in FIG. 1 so as to identify the various locations within FIG. 1 where the waveforms of FIG. 2 occur. The arrangement of FIG. 1 includes encoding circuitry 10 having an oscillator 12 and associated binary trigger 14 and AND circuits 16 and 18 for generating clock and data strobe signals, the clock signal defining the keying signal for the frequency shift transmission system. The oscillator 12, the output of which is shown in FIG. 2A, has a frequency which is chosen to provide the bit cell intervals of the data to be encoded with a desired length or time duration. The oscillator frequency also determines the frequencies of the carrier signals which, as previously noted, are related both in phase and in frequency to the keying signal. Each adjacent pair of cycles of the oscillator 12 defines a different bit cell, and a frequency of 5MHz provides bit cells of 400 nanosecond duration as shown in FIG. 2A.

The output of the oscillator 12 is applied to change the state of the binary trigger 14 upon the occurrence of each positive-going transition and to enable one of the inputs of each of the AND circuits 16 and 18 during the first and third quarter of each bit cell when the oscillator output assumes its higher value. As shown in FIGS. 2B and 2C the outputs of the AND circuits 16 and 18 respectively comprise clock and data strobe signals, the clock signal comprising those pulses from the oscillator 12 which commence at the leading edge of each bit cell and extend over the first quarter thereof, and the data strobe signal comprising those pulses from the oscillator 12 which commence at the center of each bit cell and extend over the third quarter thereof. The clock signal of FIG. 2B comprises the keying signal in that it defines each bit cell in terms of its beginning and end. Each half-cycle of the keying signal corresponds to one bit cell. Accordingly the period thereof is 800 nanoseconds, and the frequency "f" is 1.25MHz. The data strobe signal of FIG. 2C which commences at the center of each bit cell is used to determine the presence of binary "ones" as discussed below.

The eight bits comprising each byte of data to be transmitted are loaded in parallel into a shift register 20. The stored data bits are thereafter serially fed to one of the inputs of an AND circuit 22 under the control of the clock signal from the AND circuit 16, the shift register 20 providing a new data bit to the AND circuit 22 during each bit cell as defined by the clock signal of FIG. 2B. The resulting data signal at the input of the AND circuit 22 as shown in FIG. 2D assumes a high value over those bit cells representing binary "one" and a low value over those bit cells representing binary "zero".

The data signal from the shift register 20 enables the associated input of the AND circuit 22 during those bit cells representing binary "one" to pass the corresponding pulse of the data strobe signal applied to the other input of the AND circuit 22 to one input of an OR circuit 24. The OR circuit 24 adds the strobe pulses passed by the AND circuit 22 to the clock signal from the AND circuit 16 to produce a signal having positive-going transitions at the leading edge of each bit cell representing binary "zero" and at the leading edge and center of each bit cell representing binary "one" as shown in FIG. 2F. A flip-flop 26 responds to each positive-going transition of the signal at the output of the OR circuit 24 to change state and provide an intermediate signal having a voltage which varies between 0 volts and a selected value or level other than 0 such as +3 volts as shown in FIG. 2G. It will be noted that the intermediate signal shown in FIG. 2G has a voltage transition between 0 volts and +3 volts at the leading and trailing edges of each "zero" bit cell and at the leading edge, center, and trailing edge of each "one" bit cell. A transmitter 28, one preferred form of which is shown in detail in FIG. 3 and described hereafter, responds to the intermediate signal from the flip-flop 26 to provide a double frequency encoded transmission signal of similar waveform varying between opposite positive and negative voltages of substantially equal value, in this case +6 volts and −6 volts as shown in FIG. 2H.

As in the case of the intermediate signal of FIG. 2G, the transmission signal of FIG. 2H has a transition at the leading and trailing edges of each "zero" bit cell and at the leading edge, center, and trailing edge of each "one" bit cell. This double frequency encoded signal is self-clocking by virtue of the transitions at the bit cell boundaries and distinguishes "ones" from "zeros" by the presence or absence of a transition at the center of the bit cell, the sense of the transition being unimportant. The "zero" bit cells comprise a half-cycle of the first carrier signal of frequency "*f*" or 1.25MHz while the "one" bit cells comprise a full cycle of the second carrier signal of frequency "2*f*" or 2.5MHz. Both carrier signals are exactly in-phase with one another and with the keying signal of frequency "*f*" used to define the bit cells.

The double frequency encoded signal shown in FIG. 2H is transmitted over a transmission line 30 to a receiver 32. As the transmitted signal propagates along the transmission line 30 the square shoulders thereof become rounded and the signal becomes attenuated, the extent of attenuation being dependent upon the frequency thereof and the length of the transmission line 30 as well as other factors. Generally, the higher the frequency, the greater the attenuation. Transmission systems according to the invention are intended primarily for use with transmission lines having lengths on the order of one mile or less. Considerably greater lengths can of course be used depending upon the frequencies of the carrier signals and the amount of attenuation which can be tolerated.

The waveform which the transmitted signal of FIG. 2H may assume at the receiver end of a transmission line having a length of approximately 1 mile is illustrated in FIG. 2I. Whereas the transmitted signal shown in FIG. 2H has a 12 volt peak-to-peak value, the signal as shown in FIG. 2I has a peak-to-peak value typically on the order of about 600 millivolts. It will also be noted that the higher frequencies transmitted during the "one" bit cells are attenuated to a much greater extent than are the lower frequencies transmitted during the "zero" bit cells.

The receiver 32 responds to the transmitted signal to effectively reconstruct or regenerate the intermediate signal of FIG. 2G at the input of the transmitter 28. The resulting signal at the output of the receiver 32 as shown in FIG. 2J varies between zero volts and +3 volts.

The data as represented by the intermediate signal at the output of the receiver 32 is decoded by decoding circuitry 34. The intermediate signal is applied to a ⅛ bit cell delay 36 as well as to one of the inputs of an exclusive OR circuit 38. The circuit 36, which in the present example comprises a 50 nanosecond delay, delays the intermediate signal as shown in FIG. 2K prior to passing the signal to an inverter 40. The output of the invertor 40 as shown in FIG. 2L is exclusively ORed with the intermediate signal in the circuit 38 to provide an output signal as shown in FIG. 2M having a pulse at the leading edge of each bit cell and a pulse at the center of each "one" bit cell.

Figures 2A, 2B, 2C, 2D, 2E, 2F, 2G, 2H, 2I, 2J:
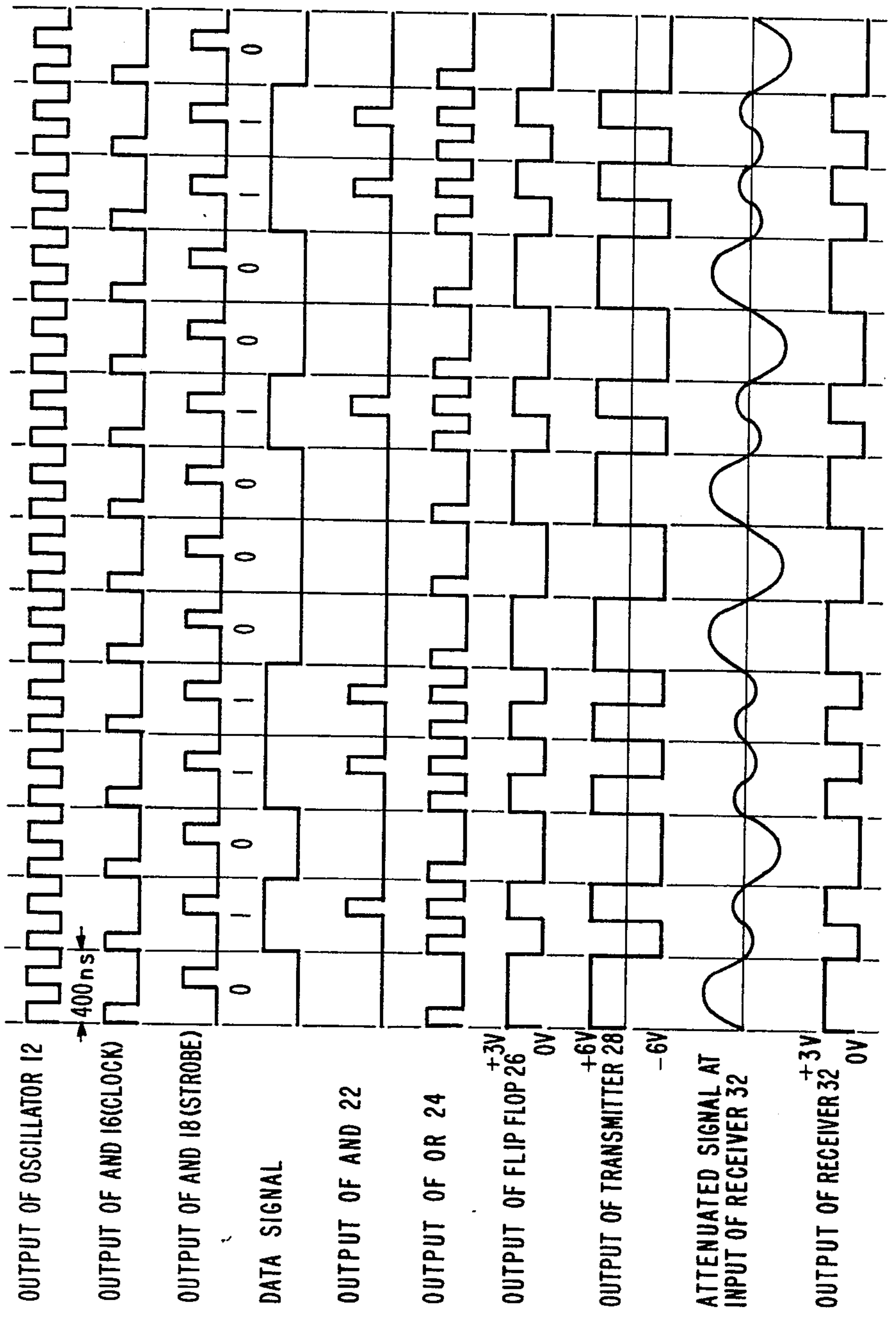
FIGS. 2A through 2U are waveforms useful in explaining the operation of the system of FIG. 1.
Figures 2, 2K, 2L, 2M, 2N, 2R, 2U:
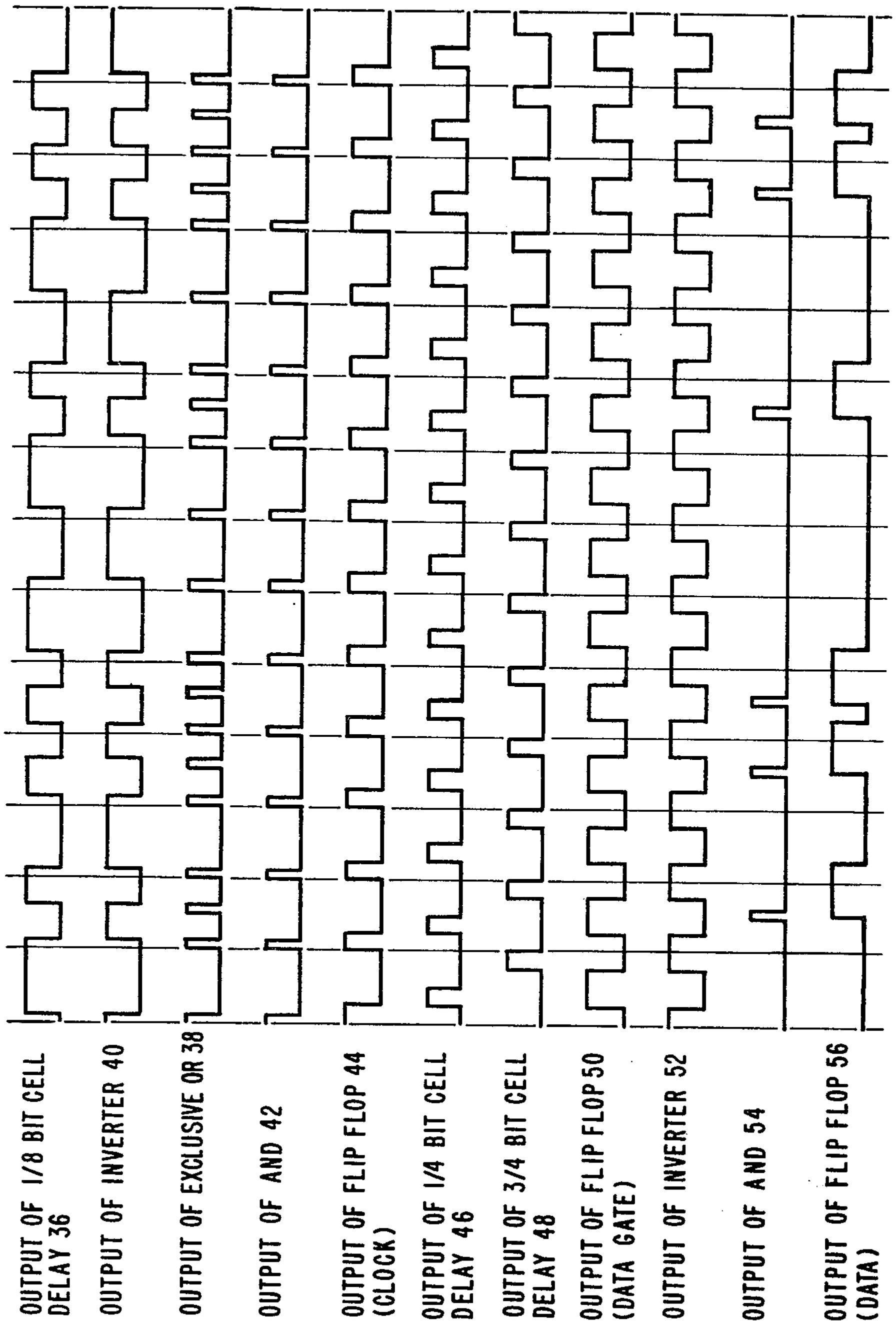

The signal at the output of the exclusive OR circuit 38 is applied to an AND circuit 42 for removal of the pulses at the bit cell centers, the remaining pulses at the bit cell leading edges as shown in FIG. 2N being applied to generate a clock signal and then a data gate signal via a flip-flop 44, a ¼ bit cell delay 46, a ¾ bit cell delay 48, a flip-flop 50 and an inverter 52. In the present example the ¼ bit cell delay 46 comprises a 100 nanosecond delay and the ¾ bit cell delay 48 comprises a 300 nanosecond delay. The data gate provided by the flip-flop 50 enables an AND circuit 54 during the center half of each bit cell to pass those pulses at the output of the exclusive OR circuit 38 occurring at the bit cell centers to a flip-flop 56. The output of the flip-flop 56 comprises the decoded data which is serially fed into a shift register 58 under the control of a clock signal provided by the flip-flop 44.

As shown in FIG. 2O the pulses at the output of the AND circuit 42 set the flip-flop 44 at the leading edge of each bit cell. The resulting pulses as delayed by the ¼ bit cell delay 46 and as shown in FIG. 2P are fed back to reset the flip-flop 44 at a point one-quarter the distance through each bit cell as well as being applied to the flip-flop 50. The clock signal of FIG. 20 is applied to the shift register 58 to control the serial loading of the data bits from the flip-flop 56 as well as being delayed by the ¾ bit cell delay 48 as shown in FIG. 2Q. The pulses from the ¼ bit cell delay 46 set the flip-flop 50 at a point one-quarter of the distance through each bit cell and the clock pulses as delayed by the ¾ bit cell delay 48 reset the flip-flop 50 at a point three-quarters of the distance through each bit cell to provide the data gate shown in FIG. 2R. The data enables the AND circuit 54 during the center half of each bit cell to pass those pulses from the exclusive OR circuit 38 which occur at the centers of bit cells to set the flip-flop 56. As shown in FIG. 2U the flip-flop 56 is reset at a point one-quarter of the distance through each following bit cell by the pulses at the output of the ¼ bit cell delay 46. The data gate is also inverted as shown in FIG. 2S to block those pulses occurring at the bit cell centers from the output of the AND circuit 42 as shown in FIG. 2N.

The "one" pulses at the output of the AND circuit 54 are lengthened by the flip-flop 56 as shown to accommodate the conditioning time for the shift register 58, which in the present example is 200 nanoseconds. When each group of eight bits is assembled in the register 58 to form a byte, the bits are transferred in parallel out of the register for use as desired.

The transmission system described thus far is unidirectional in terms of the data being encoded at one end of the transmission line 30, then transmitted to the other end of the line 30 for decoding. In actual practice the transmission system may be made bidirectional by the addition of encoding circuitry 60 similar to the encoding circuitry 10, and a transmitter 62 similar to the transmitter 28, at the opposite end of the transmission line 30 from the encoding circuitry 10 and transmitter 28. In addition a receiver 64 similar to the receiver 32 and decoding circuitry 66 similar to the decoding circuitry 34 are added at the opposite end of the transmission line 30 from the receiver 32 and decoding circuitry 34. As described hereafter in connection with FIGS. 3 and 4 the transmission system as illustrated in FIG. 1 may utilize a single transmission line 30 for bidirectional transmission, in which case the single line is time shared by the respective transmitter and receiver pairs 28, 32 and 62, 64, or alternatively may comprise two different transmission lines 30, one being coupled between the transmitter 28 and the receiver 32 for transmission in one direction and the other being coupled between the transmitter 62 and the receiver 64 for transmission in the opposite direction.

Figure 3:
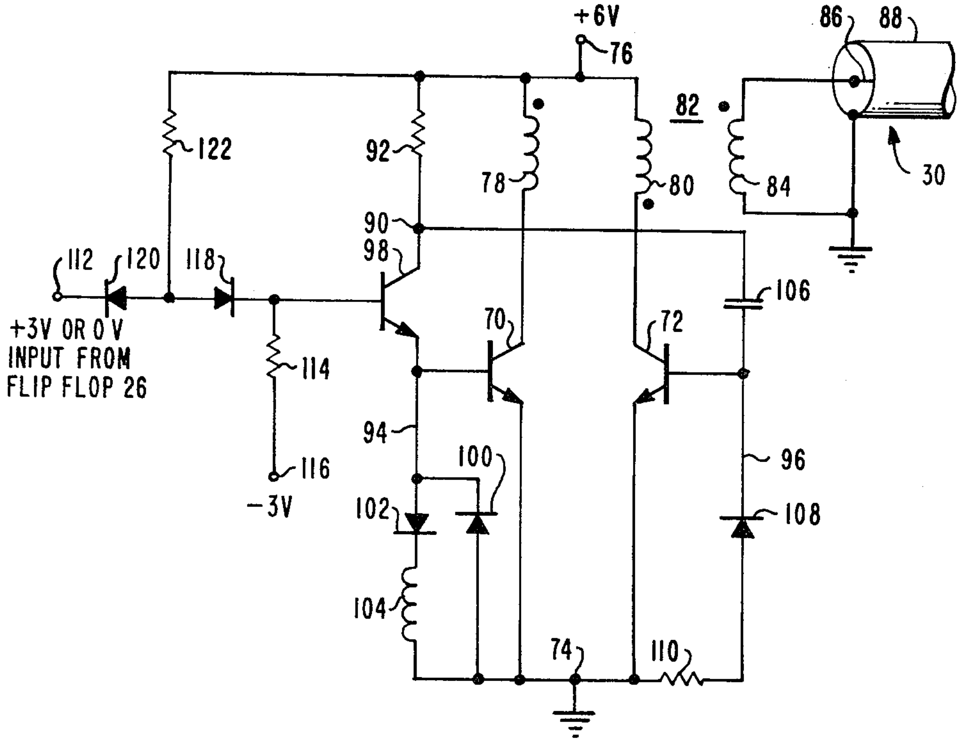
FIG. 3 is a schematic diagram of one preferred form of transmitter which may be used in the system of FIG. 1.

One preferred embodiment of the transmitter 28 or 62 of FIG. 1 is schematically illustrated in FIG. 3. The transmitter of FIG. 3 includes a pair of alternately conducting transistors 70 and 72 coupled between the opposite terminals of a power supply comprising a ground terminal 74 and a terminal 76 having a voltage of +6 volts via different ones of a pair of primary windings 78 and 80 respectively of a transformer 82. The primary windings 78 and 80 are coupled to induce voltages of opposite sense in a secondary winding 84 of the transformer 82 whenever the associated transistors 70 and 72 conduct, the induced voltages in the secondary winding 84 comprising the transmission signal shown in FIG. 2H. The transmission line 30 in this instance comprises a shielded cable having a center conductor 86 and a grounded outer shield 88.

The power supply terminal 76 is coupled to a common terminal 90 via a resistor 92. The common terminal 90 is in turn coupled to the ground terminal 74 via first and second paths 94 and 96, the first path 94 including a control transistor 98 coupled between the terminal 90 and the base of the transistor 70 and the parallel combination of diode 100 and a serially coupled diode 102 and inductive coil 104, the parallel combination being coupled between the base of the transistor 70 and the ground terminal 74. The second path 96 includes a capacitor 106 coupled between the common terminal 90 and the base of the transistor 72, and the serial combination of a diode 108 and a resistor 110 coupled between the base of the transistor 72 and the ground terminal 74. The control transistor 98 and capacitor 106 control the alternate conduction of the transistors 70 and 72. When the transistor 98 is non-conductive, current from the power supply terminal 76 flows through the resistor 92 to charge the capacitor 106. The charging current from the capacitor 106 which flows through the base-emitter junction of the transistor 72 renders the transistor 72 conductive. When the transistor 98 becomes conductive, current from the power supply terminal 76 flows through the resistor 92 and the transistor 98 biasing the transistor 70 into conduction. At the same time the capacitor 106 discharges through the transistor 98, biasing the transistor 72 into nonconduction.

Operation of the transistors 70 and 72 is thereby controlled by the conduction of the transistor 98, the conduction of the transistor 98 in turn being controlled by the output voltages from the flip-flop 26 (FIG. 1) as applied to an input terminal 112. The base of the transistor 98 is coupled through a resistor 114 to a terminal 116 which is at −3 volts and to the input terminal 112 via a pair of oppositely poled diodes 118 and 120. The junction between the diodes 118 and 120 is coupled to the power supply terminal 76 via a resistor 122.

The voltage at the terminal 116 normally biases the transistor 98 into nonconduction. When the transmitter is first turned on, the transistors 98, 70 and 72 are nonconductive, and the capacitor 106 charges to approximately +6 volts. Thereafter, when the voltage of the input terminal 112 rises to +3 volts, the transistor 98 is biased into conduction biasing the associated transistor 70 into conduction and causing a current to flow through the primary winding 78. The current in the primary winding 78 induces a voltage of approximately +6 volts in the secondary winding 84. At the same time as the transistors 98 and 70 are conducting, the charged capacitor 106 discharged through the transistor 98, the rate of discharge being determined by the resistor 110 and the capacitance of the capacitor 106. When the voltage of the input terminal 112 drops to zero volts, control transistor 98 is biased into nonconduction biasing the associated transistor 70 into nonconduction. The resulting charging current through the capacitor 106 and the base-emitter junction of the transistor 72 renders the transistor 72 conducting so that a current flows from the power supply terminal 76 through the primary winding 80. The current through the primary winding 80 induces a voltage of approximately −6 volts in the secondary winding 84.

It will be seen that the resulting signal on the transmission line 30 follows the collector of the transistor 72 and is in-phase with the input signal. The phase relationship between the input signal and the signal on the transmission line 30 is not of primary importance, however. The important thing is that dynamically the transmission line 30 experiences a transition from +6 to −6 volts or vice versa for each transition of the input signal.

After the last transition of a message has occurred, the input terminal 112 should be returned to zero volts, in which event the transistor 72 will conduct until the capacitor 106 is charged, then will turn off. If a positive voltage such as +3 volts remains at the input terminal 112 after the last transition of the message, the transistors 98 and 70 are conductive and the core of the transformer 82 quickly saturates in the absence of switching. The saturation would ordinarily result in damage or destruction of the conducting transistor 70, were it not for the presence of the diodes 100 and 102 and the inductive coil 104. The diodes 100 and 102, which are preferably Germanium diodes, typically have a voltage drop on the order of 0.3 volts thereacross when the control transistor 98 is conducting. If the transistor 70 is such as to require a base-emitter voltage drop on the order of 0.7 volts to bias it into conduction, a voltage drop on the order of 0.4 volts across the coil 104 will be required to bias the transistor 70 into conduction. When the transistor 98 is first biased into conduction, the current flow through the coil 104 is relatively small and the resulting voltage drop thereacross is relatively large, thereby biasing the transistor 70 into conduction. After about 3 microseconds, however, the current flow through the coil 104 has risen to a maximum, steady state value reducing the voltage drop thereacross to a value insufficient to maintain the transistor 70 conducting. Thus, in he absence of switching, the transistor 70 will be turned off approximately 3 microseconds after it is turned on. Since the 400 nanosecond duration of the bit cells is a small fraction of this 3 microsecond interval, the protective circuit comprising the diodes 100 and 102 and the coil 104 does not interfere with the normal operation of the transmitter.

Figure 4:
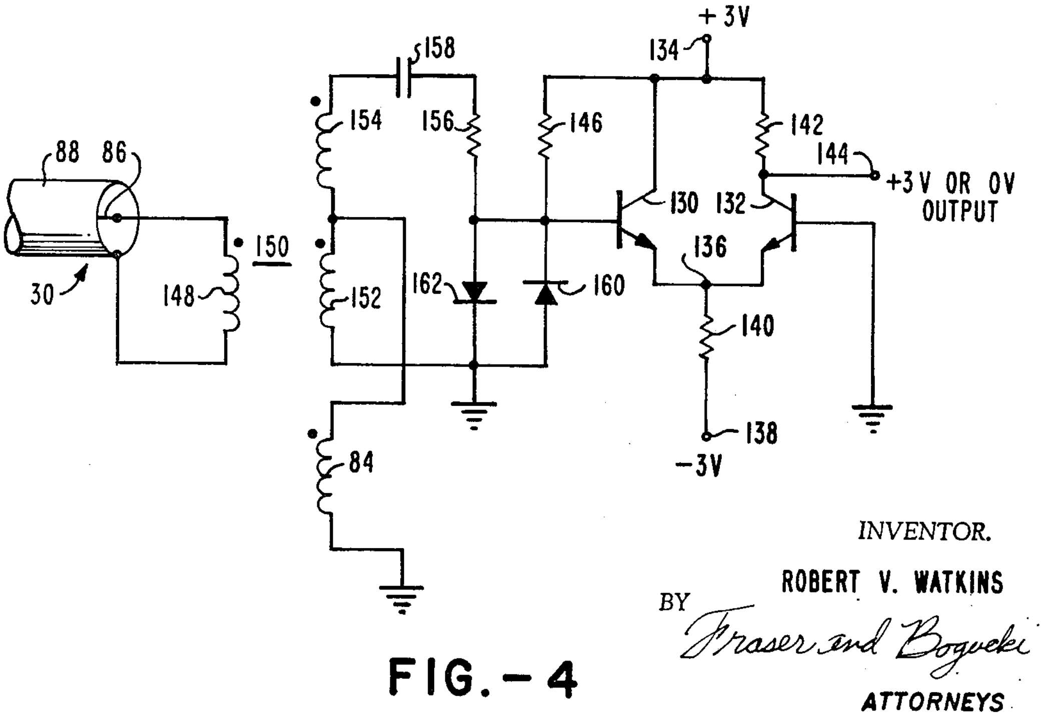
FIG. 4 is a schematic diagram of one preferred form of receiver which may be used in the system of FIG. 1.

One preferred embodiment of the receiver 32 or 64 (FIG. 1) is schematically illustrated in FIG. 4. The receiver of FIG. 4 includes a pair of alternately conductive transistors 130 and 132 coupled between a positive power supply terminal 134 of +3 volts and a common terminal 136, the terminal 136 being coupled to a negative power supply terminal 138 of −3 volts via a resistor 140. A resistor 142 is coupled between the positive power supply terminal 134 and the collector of the transistor 132, the junction between the resistor 142 and the collector of the transistor 132 defining an output terminal 144 for the receiver. The transistor 130 is biased by a resistor 146 coupled between the base thereof and the positive power supply terminal 134 as well as by input signals from the transmission line 30.

The input signals from the transmission line 30 are applied to the primary winding 148 of a transformer 150 having two substantially identical secondary windings 152 and 154. The primary winding 148 has a number of turns approximately equal to each of the secondary windings 152 and 154, and the various windings are coupled to provide a voltage step-up ratio of approximately 1:2 between the primary and secondary of the transformer 150. The step-up ratio improves the sensitivity of the receiver, particularly where the transmitted signal is highly attenuated due to factors such as length of the transmission line 32 and the like.

The base of the transistor 130 is coupled to the secondary winding 154 via a load resistor 156 and a capacitor 158 and to ground via a parallel arrangement of clamping diodes 160 and 162. The load resistor 156, the value which is chosen in accordance with the characteristic impedance of the transmission line 30, prevents reflection from the receiver 32 back toward the transmitter 28. The value of the load resistor 156 is normally chosen to be approximately four times the characteristic impedance of the line 30 due to the step-up ratio provided by the transformer 150. Thus if the line 30 has an ideal impedance of approximately 100 ohms, the load resistor 156 is chosen to have a value on the order of 400 ohms. The diodes 160 and 162 clamp the base of the transistor 130 to ground to prevent overdriving of the transistor 130 when the received signals are relatively large. The clamping diodes 160 and 162 typically limit the base of the transistor 130 to variations within a range of +300 millivolts to −300 millivolts. In this manner severely attenuated transmitted signals are sensed without danger which might otherwise be present due to relatively strong signals which are not highly attenuated.

A positive signal at the input of the receiver increases the positive bias at the base of the transistor 130 biasing the transistor 130 into conduction and the transistor 132 into nonconduction. The output terminal 144 accordingly assumes a voltage on the order of +3 volts. When a negative signal is received at the input, the transistor 130 is biased into nonconduction and the transistor 132 is biased into conduction dropping the voltage at the output terminal 144 to approximately zero volts. In this manner the intermediate signal at the input of the transmitter 28 at the transmitting end of the line 30 is effectively reconstructed or regenerated at the output of the receiver 32 at the receiving end of the line 30.

It will be noted that transformer coupling is provided at both ends of the transmission line 30, the transmitter 28 being coupled to the line 30 via the transformer 82 and the receiver 32 being coupled to the line 30 via the transformer 150. Such transformer coupling provides isolation and greatly minimizes the common mode noise and ground shift problems which might otherwise be present. As previously mentioned the load resistor 156 in the receiver 32 (FIG. 4) minimizes noise reflection. The output impedance of the transmitter 28 (FIG. 3) is also made approximately equal to the impedance of the transmission line 30 to provide high noise immunity.

As previously mentioned the transmission line may comprise a single line such as the coaxial cable 30 shown in FIGS. 3 and 4, or alternatively may comprise two or more lines, each of which is coupled between a different transmitter and receiver. Where a single transmission line 30 is to be used on a time shared basis for transmission in both directions, the secondary winding 84 of the transformer 82 of each transmitter may be coupled between ground and the junction between the secondary windings 152 and 154 of the receiver transformer 150 as shown in FIG. 4. The receiver operates in the manner previously described. During transmission voltages are induced in the secondary winding 84 by the primary windings 78 and 80 as described in connection with FIG. 3, in which case the secondary winding 152 of the receiver transformer 150 acts as a primary winding to induce the voltage in the winding 148 for transmission in the opposite direction.

As discussed in connection with the transmitter of FIG. 3 an input signal of zero volts at the input terminal 112 at the end of transmission renders the transistor 72 conductive until the capacitor 106 has charged to approximately +6 volts, at which time the transistor 72 becomes nonconductive and the voltage at the center conductor 80 of the transmission line 32 returns to zero volts. This return of the center conductor 80 to zero volts comprises a transient signal which may be erroneously detected as a transmitted signal, particularly where the transmitter is coupled to the transmission line 30 via the transformer 150 of the opposite receiver as described in FIG. 4 in connection with single transmission line operation. Errors which might otherwise result from such transient signals may be eliminated by providing an appropriate time delay such as 15 microseconds between the termination of transmission in one direction and the commencement of transmission in the opposite direction.

It will be appreciated that synchronous frequency shift data transmission systems according to the invention provide numerous advantages not realizable with nonsynchronous frequency shift and other types of known transmission systems. Currently used nonsynchronous frequency shift transmission systems, for example, seldom have bit cells which are smaller than about 800 nanoseconds. Accordingly the 400 nanosecond bit cells of the particular embodiment of the present invention described above provide for approximately twice the data density of the nonsynchronous type systems. The synchronous systems of the present invention, moreover, are self-clocking and accordingly provide for the transmission of clocking signals within the bandwidth required for the two basic carrier frequencies. In the nonsynchronous systems of the prior art where synchronization is difficult and uneven clocking intervals are common, it is frequently required that a clocking signal be separately transmitted, thereby greatly increasing the required bandwidth for the system. In the synchronous transmission systems of the invention, transmission may begin as soon as a few clocks are generated. The transmitting and receiving circuitry operates in logical fashion and provides isolation by use of transformer coupling at both ends of the transmission line and without the need for a separate load switch or similar device.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An arrangement for encoding data for transmission over a transmission line, the data to be encoded appearing in the form of a data signal which is arbitrarily divided into a succession of substantially uniform bit cells and which assumes a high or low value within each bit cell to represent one or the other of opposite binary characterizations, comprising:

means responsive to the data signal for generating an intermediate signal having a succession of bit cells corresponding to the bit cells of the data signal and a voltage which varies between zero and a selected value other than zero, the intermediate signal having a voltage transition between zero and the selected value at the leading and trailing edges of each bit cell in which the data signal assumes the low value and a voltage transition between zero and the selected value at the leading edge, center, and trailing edge of each bit cell in which the data signal assumes the high value; and means coupled between the intermediate signal generating means and the transmission line and responsive to the intermediate signal to generate a signal for transmission over the transmission line, the transmission signal having a succession of bit cells corresponding to the bit cells of the intermediate signal and a voltage which varies between opposite positive and negative voltages of substantially equal value, the transmission signal having a voltage transition between the opposite positive and negative voltages at various locations within the bit cells corresponding to the voltage transitions of the intermediate signal, the transmission signal generating means including first and second alternately conductive transistors coupled to respectively provide the opposite positive and negative voltages to the transmission line when conducting, a power supply, a transformer having a pair of primary windings and a secondary winding coupled to the transmission line, means coupling different ones of the pair of primary windings between the power supply and the first and second transistors, and means responsive to the intermediate signal for biasing the first transistor into conduction whenever the voltage of the intermediate signal assumes the selected value and for biasing the second transistor into conduction whenever the voltage of the intermediate signal assumes zero value, the biasing means including a third transistor coupled to be biased into nonconduction and conduction whenever the voltage of the first signal assumes zero value and the selected value respectively, and coupled to bias the first transistor into conduction when conducting, and a capacitor coupled to render the second transistor conductive when charging and to discharge through the third transistor and thereby prevent conduction of the second transistor whenever the third transistor is conducting.

2. The invention defined in claim 1 above, further including:

means associated with the first transistor for biasing the first transistor into nonconduction independently of the third transistor whenever the first transistor conducts for a predetermined period of time.

3. The invention defined in claim 2 above, wherein the means for independently biasing the first transistor into nonconduction comprises:

a coil;

a pair of diodes; and means for coupling the serial combination of the coil and one of the diodes between base and emitter terminals of the first transistor and for coupling the other one of the diodes in parallel with the serial combination.

4. An arrangement for decoding data transmitted over a transmission line, the data to be decoded appearing in the form of a transmitted signal which is arbitrarily divided into a succession of substantially uniform bit cells and which has a transition between opposite positive and negative voltages of substantially equal value at the leading and trailing edges of each bit cell representing one binary characterization and a transition at the leading edge, center and trailing edge of each bit cell representing a binary characterization opposite the one binary characterization, comprising:

means coupled to the transmission line and responsive to the transmitted signal for generating an intermediate signal having a succession of bit cells corresponding to the bit cells of the transmitted signal and a voltage which varies between zero and a selected value other than zero, the intermediate signal having a voltage transition between zero and the selected value at various locations within the bit cells corresponding to the voltage transitions of the transmitted signal, the intermediate signal generating means including first and second alternately conductive transistors, the first transistor providing the intermediate signal voltage with zero value when conducting and with the selected value when not conducting, a transformer having a primary winding coupled to the transmission line and a pair of secondary windings for providing a step-up voltage ratio, and means responsive to the transmitted signal for biasing the first transistor into conduction whenever the transmitted signal has the positive voltage and for biasing the second transistor into conduction whenever the transmitted signal has the negative voltage, the biasing means including a resistor and a capacitor coupled between the secondary windings and the first transistor, the value of the resistor being selected in accordance with the characteristic impedance of the line to provide impedance matching; and means responsive to the intermediate signal for generating a data signal having a succession of bit cells corresponding to the bit cells of the intermediate signal, the data signal assuming a high value within those bit cells in which the intermediate signal has a voltage transition at the leading edge, center and trailing edge and assuming a low value within those bit cells in which the intermediate signal has a voltage transition at the leading and trailing edges.

5. The invention defined in claim 4 above, further including a pair of diodes coupled in parallel between a source of reference potential and the first transistor, the diodes clamping the first transistor to prevent overdriving thereof.

6. The invention defined in claim 4 above, further including a transformer winding coupled to one of the pair of secondary windings, the transformer winding functioning as a secondary winding for transmission over the transmission line.

7. A synchronous frequency shift data transmission system for transmitting binary data over at least one transmission line, comprising:

timing means including keying signal generating means for generating a succession of signal indications to define bit cells for the binary data to be transmitted, means for generating a clock pulse at the leading edge of each bit cell, and means for generating a data strobe pulse at the center of each bit cell;

means coupled to the at least one transmission line and responsive to the timing means and to the binary data to be transmitted for transmitting a half-cycle of a first signal within those bit cells representing one binary characterization and for transmitting a full cycle of a second signal within those bit cells representing the opposite binary characterization, the first signal being in-phase with and having a frequency equal to that of the keying signal and the second signal being in-phase with and having a frequency equal to twice that of the keying signal, said means for transmitting including register means for temporarily storing binary data bits to be transmitted, a different data bit being advanced out of the register means upon the occurrence of each clock pulse, means responsive to the clock and data strobe pulses and to the data bits being advanced out of the register means for adding a data strobe pulse to the clock pulses in response to each advanced data bit which represents binary "one", bistable means coupled to change state in response to each clock pulse and to each added data strobe pulse, the bistable means providing an output voltage which varies between zero and a selected level in response to the state changes, and means responsive to the bistable means output voltage and coupled to the at least one transmission line for providing a positive voltage of selected value whenever the bistable means output voltage assumes the selected level and for providing a negative voltage of value substantially equal to the selected value whenever the bistable means output voltage is zero;

means coupled to the at least one transmission line and responsive to the transmitted first and second signals for detecting the bit cells thereof; and means associated with the bit cell detecting means and responsive to the transmitted first and second signals for detecting the binary data within each bit cell in accordance with the particular one of the first and second signals transmitted therein.

8. A synchronous frequency shift data transmission system for transmitting binary data over at least one transmission line, comprising:

timing means including keying signal generating means for generating a succession of signal indications to define bit cells for the binary data to be transmitted;

means coupled to the at least one transmission line and responsive to the timing means and to the binary data to be transmitted for transmitting a half-cycle of a first signal within those bit cells representing one binary characterization and for transmitting a full cycle of a second signal within those bit cells representing the opposite binary characterization, the first signal being in-phase with and having a frequency equal to that of the keying signal and the second signal being in-phase with and having a frequency equal to twice that of the keying signal, the first and second signals having voltages which vary between positive and negative voltages of substantially equal value;

means responsive to the transmitted first and second signals for detecting the binary data within each bit cell in accordance with the particular one of the first and second signals transmitted therein, and including means responsive to the first and second signals for generating an intermediate signal, the voltage of which assumes a selected level whenever the voltage of the first or second signal is positive and zero whenever the voltage of the first or second signal is negative, means responsive to the intermediate signal for generating pulses of selected duration in time coincidence with the transitions thereof, register means, and means responsive to the pulses and coupled to the register means for passing those pulses which occur at the center of a bit cell to the register means to the exclusion of all other pulses; and means associated with the means for detecting the binary data and responsive to the transmitted first and second signals for detecting the bit cells thereof, said means including means responsive to the pulses for blocking those pulses which occur other than at the leading edges of bit cells.

* * * * *